June 28, 1938. W. E. GREENAWALT 2,121,869
FLYWHEEL BRAKE
Filed June 10, 1936
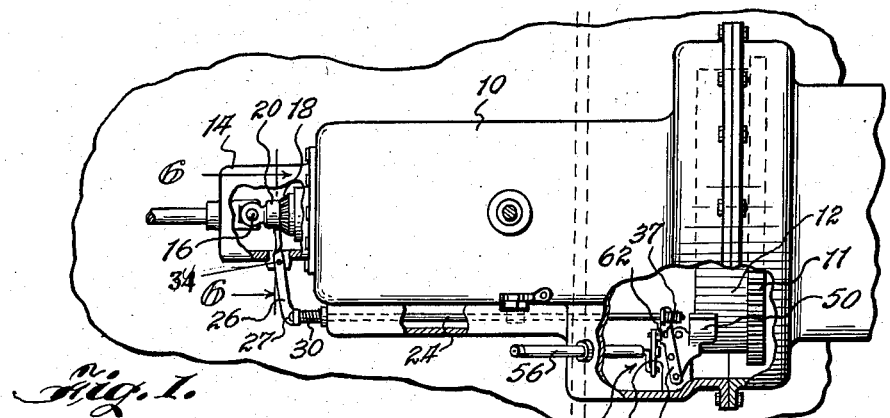
Fig. 1.
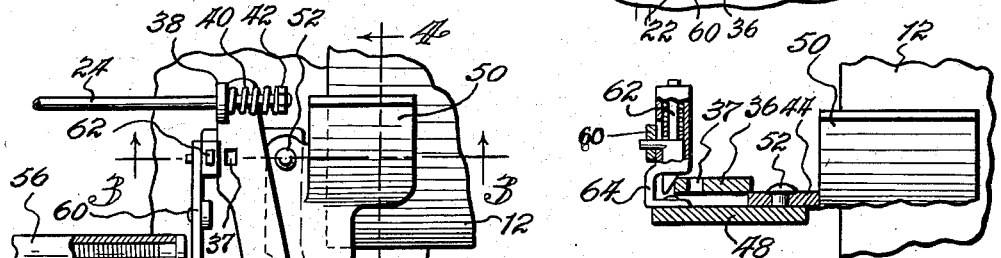
Fig. 2.
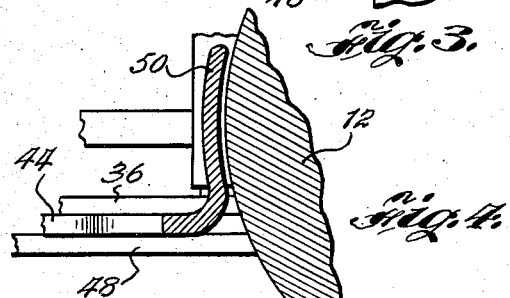
Fig. 3.
Fig. 4.
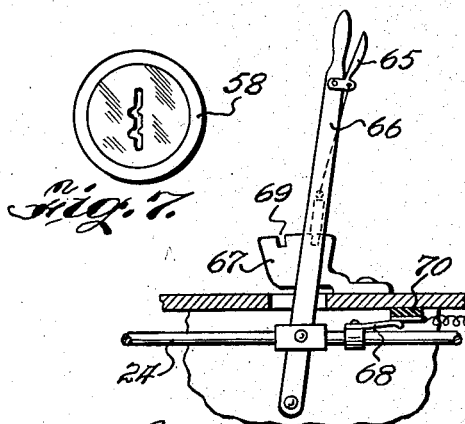
Fig. 7.
Fig. 5.
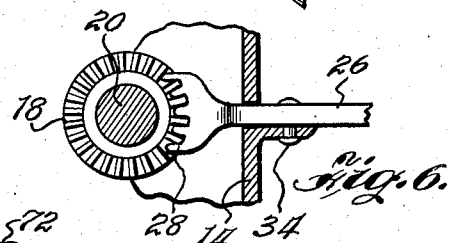
Fig. 6.
William E. Greenawalt
INVENTOR.
BY John M. Spellman
ATTORNEY.

Patented June 28, 1938

2,121,869

UNITED STATES PATENT OFFICE 2,121,869

FLYWHEEL BRAKE

William E. Greenawalt, Dallas, Tex.

Application June 10, 1936, Serial No. 84,494

4 Claims. (Cl. 188—2)

This invention relates primarily to a brake means for the flywheel of a motor vehicle so as to prevent theft of the vehicle.

A further object of this invention is to provide locking means which is so constructed that it can not be easily tampered with.

It is another object of this invention to provide a locking apparatus which is simple in construction and economical of manufacture.

The novel features that I consider characteristic of my invention are set forth with particularity in the appended claims. Other objects and advantages will be best understood from the following description of the specific embodiment when read in connection with the accompanying drawing, in which:

Figure 1 is a plan view of the transmission and flywheel housing with parts broken away, disclosing my improved apparatus in place;

Figure 2 is an enlarged view of the locking device for the flywheel shown in Figure 1.

Figure 3 is a sectional view taken on the line 3—3 of Figure 2, disclosing the pawl means for locking and unlocking the apparatus.

Figure 4 is a sectional view taken on the line 4—4 of Figure 2, disclosing the locking means or clutch shoe for the flywheel.

Figure 5 is a side view of a part of the control rod of my improved locking apparatus and of the handle for operating the locking apparatus.

Figure 6 is a sectional view taken on line 6—6 of Figure 1 showing the locking means for the drive shaft.

Figure 7 is a plan view of the lock operating means which is mounted on the panel of the vehicle.

Referring in detail to the drawing, 10 is the housing for the transmission (not shown) and the flywheel assembly 12. There is a housing 14 for the universal joint 16 and the special pinion 18 which is mounted on drive shaft 20. The locking apparatus as a whole is designated by the numeral 22.

The brake apparatus 22 is mounted in the flywheel housing. A control rod 24 of the brake apparatus 22 is spaced along one side of or through the transmission housing 10 and has a lever bar 26 connected by bolt and nut means 27 to its rear end. A coil spring 30 is mounted on the control rod 24. The lever bar 26 has a toothed shoe 28 on its outer end which is adapted to engage the special pinion 18 mounted on the drive shaft 20 (either separate or on universal joint, half of which is nearest transmission housing) when the brake apparatus 22 is in operative position. The lever bar 26 is pivoted by bolt means 34 to the universal housing 14.

A lever bar 36 is connected by bearing means 38 at a point near the front end of the control rod 24, and a coil spring 40 is mounted on the rod 24 between the bearing means 38 and nut means 42 on the end of the rod 24. Lever bar 36 is pivoted by bolt means 46 at its lower end to a second lever bar 44. There is a slot 47 in the lever bar 36 which receives the bolt means 46. Lever bars 36 and 44 are spaced to one side of the flywheel 12, looking from rear to front. A vertical bearing or support member 48 is spaced to one side of the flywheel 12 so that the lever bars 36 and 44 are fulcrumed at one side of the flywheel. The lever bar 44 has a shoe member 50 on the opposite end to which it is pivoted to lever bar 36 and shoe member 50 is adapted to engage outside portion 11 of the flywheel 12 when the brake apparatus 22 is in operative position. Since the lever bar 44 is spaced to one side of the flywheel, the shoe member 50 on the end of the lever bar 44 engages the flywheel on its surface above transverse center. The lever bar 44 is fulcrumed to the vertical support 48 adjacent the shoe member 50 by bolt means 52. And the lever bar 36 is also fulcrumed by bolt means 54 near the pivot pins 46 to the vertical support 48. The vertical support 48 is secured to the flywheel housing or may be a part thereof. The lever bar 36 has a slot 37 adjacent the end which is secured to the control rod 24.

A flexible shaft 56 is connected to a key operated lock 58 on the panel board (not shown). A lever 60 is connected to the lower end of the flexible shaft 56, and the lever 60 is connected by appropriate screw or bolt means to a pawl 62. The pawl 62 is mounted in a stationary bracket 64 which is secured to the vertical support 48.

A special lever 66 is shown in Figure 5 fastened by appropriate securing means to the control rod 24. The lever 66 has a dog member 65 which is adapted to co-operate with the notches 69 in the ratchet block 67. The lever 66 is spaced between the gear shift lever and the emergency brake lever (not shown), or at any convenient place desired. In close proximity to the lever 66 is a switch means 68 which is secured to the control rod 24. The numeral 70 indicates a contact and 72 indicates conductor wires leading to the car battery (not shown).

The operation of the apparatus is as follows:—
When it is desired to move the shoe member 50 into engagement with the flywheel and lock the drive shaft and also cut the current off from the battery, so that the automobile cannot be easily stolen, the lever 66 is pulled toward the rear of the car and is locked in a notch 69 in the ratchet block 67. When the lever 66 is pulled back, thus moving the control rod 24, the switch means 68 is pulled away from the contact 70, thereby breaking the circuit to the battery. Since the current is cut off from the battery, all circuits in the car are also broken. The control rod 24 also swings the lever bar 26 about the pivot 34 and moves the toothed shoe 28 into engagement with the special pinion 18 on the drive shaft 20, thereby locking the rear wheels of the car. The control rod also at the same time pulls back the lever bar 36, which bar turns on the fulcrum 54 and moves the lever bar 44 horizontally toward the flywheel 12. As the lever bar 44 is moved horizontally, it turns on the fulcrum point 52, and as a result the shoe member 50 engages the flywheel 12. When the lever bar 36 is pulled back, it raises the pawl 62 which then registers with the slot 37 in the bar 36. No key is necessary to lock the car, the lock is entirely automatic. A key is only needed to unlock it. Pulling lever 66 back immobilizes the engine and rear axle and breaks the circuit, all of which is effected with backward movement of lever 66. If it is desired to unlock the parts of the car, the pawl 62 is unlocked by means of key in the panel board, and then lever 66 is pushed forward, and at this time the toothed shoe 28 is disengaged from the special pinion 18, switch means 68 engages the contact 70, and shoe member 50 of the lever bar 44 disengages the flywheel 12. The brake means for the flywheel is mounted on its upper side so that it would be necessary to dismantle the housing before the lock could be broken.

It is to be understood that my apparatus shown in the drawing and described in the above specification is merely illustrative and that the invention is not limited thereto since alterations and modifications will readily suggest themselves to persons skilled in the art, without departing from the spirit of the invention or the scope of the annexed claims.

What I claim as new is:

1. In a brake of the character described being confined within a housing for the flywheel of an internal combustion engine, the said brake comprising a shoe member movable by an operating lever through linkage means into contacting and non-contacting positions relative to said flywheel, the said shoe member being an integral part of a lever bar and the said lever bar being pivoted to the housing, a second lever bar secured to the first mentioned lever bar and the second lever bar being pivoted to the housing, a rod member being secured to the second mentioned lever bar opposite the end to which it is secured to the first mentioned lever bar, and the said rod member having the said operating lever secured thereto.

2. In a brake of the character described being confined within a housing for the flywheel of an internal combustion engine, the said brake comprising a shoe member movable by an operating lever through linkage means into contacting and non-contacting positions relative to said flywheel, the said shoe member being an integral part of a lever bar and the said lever bar being pivoted to the housing adjacent the shoe member, a second lever bar secured to the first mentioned lever bar and the said second mentioned lever bar being pivoted to the housing adjacent the end to which the first mentioned lever bar is secured to the second mentioned lever bar, a rod member being secured to the second mentioned lever bar opposite the end to which it is secured to the first mentioned lever bar, and the said rod member having the said operating lever secured thereto.

3. In a brake of the character described being confined within a housing for the flywheel of an internal combustion engine, the said brake comprising a shoe member movable by an operating lever through linkage means into contacting and non-contacting positions relative to said flywheel, the said shoe member being an integral part of a lever bar and the lever bar being pivoted to the housing, a second lever bar secured to the first mentioned lever bar and the second lever bar being pivoted to the housing, a slot in the end of the said second lever bar opposite the end to which it is secured to the first mentioned lever bar, pawl means carried by a third lever bar, a rod member being secured to the end of the second mentioned lever bar having the said slot therein, the said rod member having the said operating lever secured thereto, and when the operating lever is pulled back thereby actuating the shoe member into engagement with the flywheel through the means of the rod member and the first and second mentioned lever bars, and the pawl means registering with the slot in the second mentioned lever bar.

4. In a brake of the character described being confined within a housing for the flywheel of an internal combustion engine, the said brake comprising a shoe member movable by an operating lever through linkage means into contacting and non-contacting positions relative to said flywheel, the said shoe member being an integral part of a lever bar and the lever bar being pivoted to the housing, a second lever bar secured to the first mentioned lever bar and the second lever bar being pivoted to the housing, a slot in the end of the said second lever bar opposite the end to which it is secured to the first mentioned lever bar, a pawl means carried by a third lever bar, a rod member being secured to the end of the second mentioned lever bar having the said slot therein, the said rod member having the said operating lever secured thereto, and when the operating lever is pulled back thereby actuating the shoe member into engagement with the flywheel through the means of the rod member and the first and second mentioned lever bars and the pawl means registering with the slot in the second mentioned lever bar, and a flexible shaft secured to the third mentioned lever bar and means for actuating the flexible shaft so that the third mentioned lever bar lifts the pawl means from the slot in the second mentioned lever bar.

WILLIAM E. GREENAWALT.